United States Patent [19]
Strähle

[11] Patent Number: 5,991,090
[45] Date of Patent: Nov. 23, 1999

[54] AFOCAL ZOOM SYSTEM

[75] Inventor: Fritz Strähle, Heubach, Germany

[73] Assignee: Carl-Zeiss-Stiftung, Heidenheim, Germany

[21] Appl. No.: 09/160,245

[22] Filed: Sep. 25, 1998

[30] Foreign Application Priority Data

Sep. 29, 1997 [DE] Germany .......................... 197 42 843

[51] Int. Cl.[6] .......................... G02B 21/02; G02B 21/22; G02B 15/15
[52] U.S. Cl. .......................... 359/660; 359/376; 359/377; 359/663; 359/677
[58] Field of Search .................................... 359/376, 377, 359/677, 663, 660

[56] References Cited

U.S. PATENT DOCUMENTS

| | | | |
|---|---|---|---|
| 2,901,943 | 9/1959 | Tackaberry | 359/377 |
| 3,127,466 | 3/1964 | Walters | 359/660 |
| 4,217,025 | 8/1980 | Takenaka | 359/377 |

FOREIGN PATENT DOCUMENTS 39 04 190  11/1989  Germany .

Primary Examiner—Georgia Epps
Assistant Examiner—Evelyn A. Lester
Attorney, Agent, or Firm—Walter Ottesen

[57] ABSTRACT

The invention is directed to an afocal zoom system for a surgical microscope. The zoom system has an even number of members and is symmetrically configured.

7 Claims, 2 Drawing Sheets

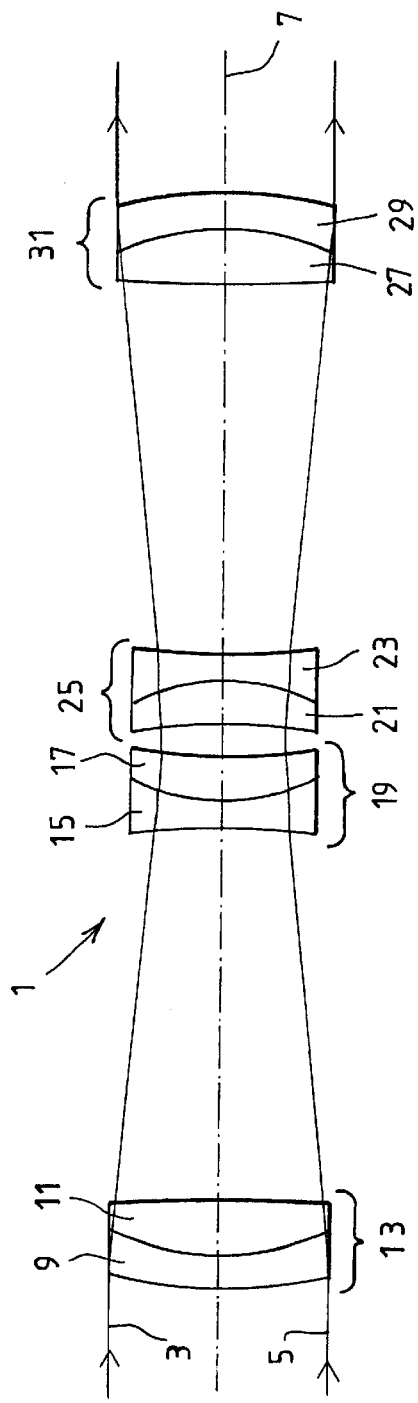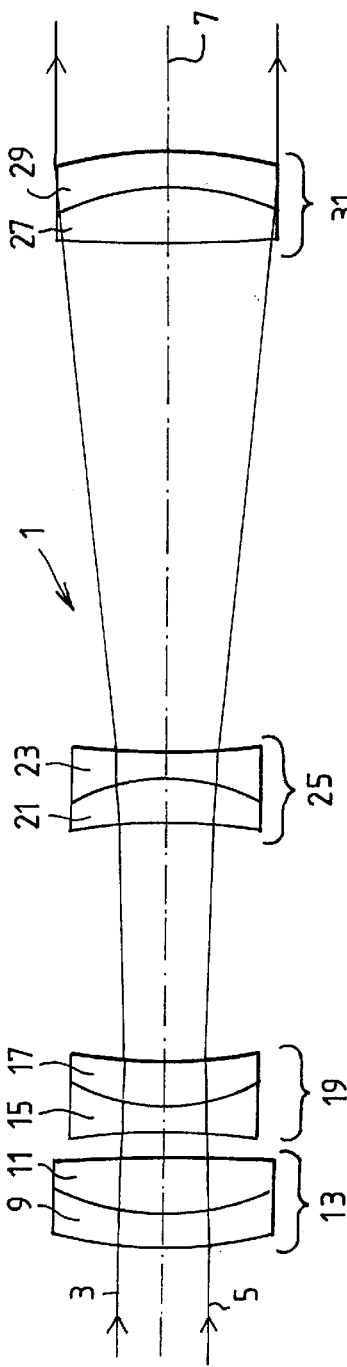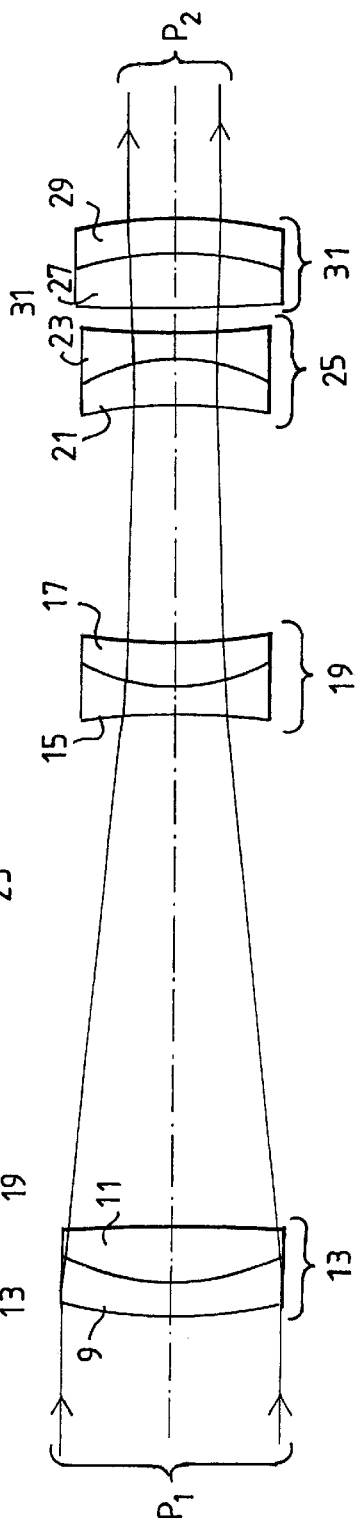

AFOCAL ZOOM SYSTEM

FIELD OF THE INVENTION

The invention relates to an afocal zoom system having an even number of optical elements and a microscope of the telescope type such as a stereomicroscope. The stereomicroscope is equipped with an afocal zoom system of this kind.

BACKGROUND OF THE INVENTION

German patent publication 3,904,190 discloses a zoom system of this type. This known afocal zoom system is for a stereomicroscope of the telescope type such as a surgical microscope. The zoom system of German patent publication 3,904,190 includes ten different lenses and is therefore of a comparatively complex configuration.

SUMMARY OF THE INVENTION

It is an object of the invention to provide an afocal zoom system having an even number of optical members and which can be simply configured and produced at more favorable cost while providing optimal correction of imaging errors.

The afocal zoom system of the invention is for a surgical microscope and the afocal zoom system includes: an even number of optical members; and, the optical members being arranged in a symmetrical configuration.

The number of different lenses of the zoom system can be greatly reduced because of the symmetrical configuration. From this, a reduced manufacturing complexity results and reduced manufacturing costs result because of the higher numbers of like lenses. Furthermore, the symmetrical configuration makes possible an optimal correction of off-axis image errors (such as chromatic aberrations, tangential distortion and coma) via an approximately central pupil position in each magnification.

Especially with respect to the use of the afocal zoom system in a microscope of the telescope type, it is essential that the afocality is maintained over the entire pancratic magnification range; that is, parallel beams entering the zoom system must leave the zoom system as parallel beams in each position thereof.

The number of different lens types is minimal when the afocal system has four members.

In a further embodiment, the afocal zoom system includes two fixed outer members and two movable inner members which are displaceable in the same direction on different curves. In this way, the displacement mechanics of the zoom system can be adapted very well to the limited space in the microscopes.

When the zoom system has two positive outer members and two negative inner members, a zoom system having a very short structural length is possible by a suitable selection of the focal widths. The image field curvature can be optimally corrected via a suitable combination of focal widths of the positive outer members and of the inner members. This is so because the negative image field curvature, which is generated by the positive outer members, is substantially compensated with the positive image field curvature generated by the negative inner members.

The spherical aberration and the chromatic longitudinal aberration can be essentially corrected in each composite lens when building up the afocal zoom system from preferably four composite elements. The residual error remaining can be virtually diffraction-limited corrected in each zoom position by the total correction of the afocal zoom system.

For glasses having anomalous partial dispersion, the chromatic longitudinal aberration can be effectively corrected in such a manner that the zoom system of the invention exhibits an apochromatic correction of the chromatic longitudinal aberration which is limited only by the diffraction. It has therefore been shown to be advantageous to use glasses having anomalous partial dispersion in the outer members as well as in the inner members.

The afocal zoom system, which is disclosed in Table 1, is an especially advantageous embodiment of the invention because of the following: its pancratic expansion factor of 6; its high light intensity especially in the lower and middle magnification ranges of approximately 0.4 to approximately 1.0; and, the fact that it is configured of only two different two-element composite members. The zoom systems shown in Tables 2 and 3 are also interesting embodiments for use and practice.

The invention also relates to a microscope having one of the afocal zoom systems of the kind discussed above. A compact microscope body results because of the short structural length of the symmetrical afocal zoom system. This compact microscope body offers important ergonomic advantages for the user. This is especially an easy movability of the microscope and a large range of play for the optimal adjustment of the viewing elevation, for example, by means of a pivotable binocular telescope.

When the microscope is a stereomicroscope, the centering complexity can be relatively low because of the symmetry of the zoom system. This centering complexity is required for the parallelism of the stereoscopic component beam paths of the stereomicroscope. It should here be noted that this parallelism is of great significance over the entire pancratic magnification range for a stereomicroscope of the telescope type because a deviation therefrom can lead to considerable disturbances of the stereoscopic viewing. This deviation is characterized as binocular error.

The high light intensity of the symmetrical afocal zoom system is of great advantage especially for a stereomicroscope according to the invention configured as a surgical microscope. The illumination intensity of the surgical field microscope can be reduced because of the high light intensity. Accordingly, on the one hand, the patient is relieved and, on the other hand, the imaging quality of the surgical microscope is increased by a reduction of the contrast reducing stray light.

BRIEF DESCRIPTION OF THE DRAWINGS

The invention will now be described with reference to the drawings wherein:

FIG. 1 is a schematic representation of an embodiment of a symmetrical afocal zoom system in longitudinal axial section;

FIG. 2 shows the zoom system of FIG. 1 in a position having a lower magnification;

FIG. 3 shows the zoom system of FIG. 1 in a position having a higher magnification; and, FIG. 4 is a schematic representation of a stereomicroscope according to an embodiment of the invention.

DESCRIPTION OF THE PREFERRED EMBODIMENTS OF THE INVENTION

Figure 4:
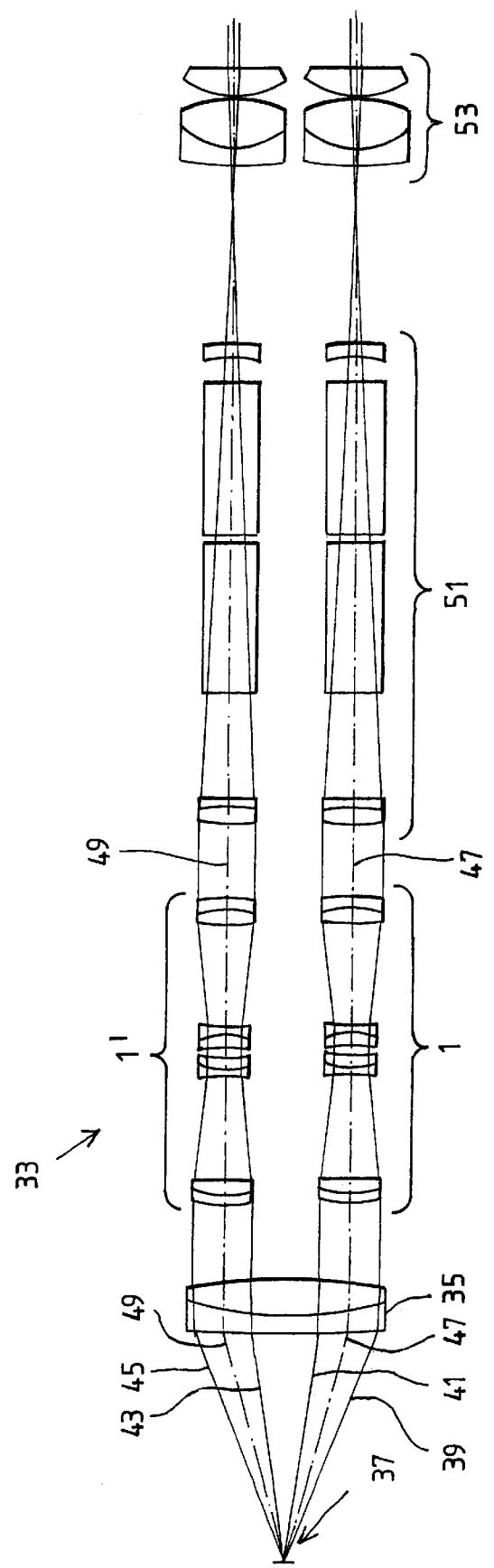

In FIG. 1 a four member embodiment of an afocal zoom system 1 is shown together with peripheral rays 3 and 5 of a beam running parallel to the optical axis 7.

The afocal zoom system 1 includes a composite lens 13 having positive refractive power. The composite lens 13 is at the object end and comprises two individual lenses 9 and 11. At the image side, a composite lens 19 of negative refractive power follows the composite lens 13 and includes individual lenses 15 and 17. At the image side, a composite lens 25 of negative refractive power follows the composite lens 19. The composite lens 25 is made up of lenses 21 and 23. Composite lens 31 of positive refractive power follows the composite lens 25 and includes lenses 27 and 29.

The lens 9 is the same as lens 29 because of the symmetrical configuration of the afocal zoom system 1. Also, the lens 11 is the same as lens 27 and the lens 15 is the same as lens 23. The lens 17 is the same as lens 21. Lenses 21, 23, 27 and 29 are arranged about a median symmetry plane, which is orthogonal to the optical axis 7, as a mirror image to lenses 9, 11, 15 and 17.

The symmetry provided by the invention is even satisfied when lenses which are the same have different clear diameters. What is decisive for the symmetry are the radii of curvature, glass types and mirror image arrangement in the entire system.

The position of the afocal zoom system according to FIG. 1 corresponds to a magnification of $\Gamma=1$. This can be seen here in that the diameter of the beam entering the zoom system 1 has the same diameter as the beam exiting the zoom system.

In FIG. 2, the zoom system 1 is shown in a position which corresponds to a magnification of $\Gamma=0.4$. For this magnification, the two inner composite lenses 19 and 25 are displaced toward the outer lens 13. The afocal zoom system 1 thus permits a variation of magnification for fixed outer members 13 and 31, only the distances between the two inner members 19 and 25 as well as between the inner member 19 and the outer member 13 and between the inner member 25 and the outer member 31 are varied.

In FIG. 3, the afocal zoom system 1 is in a position corresponding to the magnification of $\Gamma=2.4$. For this magnification, the inner members 19 and 25 of negative refractive power come closer to the image side outer member 31 of positive refractive power with the outer members 13 and 31, in turn, being stationary.

From FIGS. 1 to 3, it can be seen that the displacement region of the inner members 19 and 25 utilizes the entire region between the outer members 13 and 31. The inner members 19 and 25 are displaced on different curves in the same direction. In this way, the total structural length of the afocal zoom system is utilized for varying magnification.

It can be further seen that a constant high light intensity is achieved from small magnifications of $\gamma=0.4$ to the intermediate magnification of $\gamma=1$. This light intensity is only determined by the beam limiting clear diameter of the image side outer member 31 for a pregiven image side field angle. In this magnification range, there is no limitation by the two inner members 19 and 25.

For higher magnifications starting at $\Gamma=1$, the clear diameter of the object end outer member 13 limits the cross section of the beam and therefore also the beam cross section $P_2=P_1/\Gamma$. This image side beam cross section is decisive for quantifying the light intensity.

An afocal zoom system 1, which is characterized by a compact configuration, results because of the configuration of the zoom system 1 of the two positive outer members 13 and 31 as well as the two negative inner members 19 and 25.

The lenses 11 and 27 of positive refractive power in the outer members 13 and 31 comprise crown glass having anomalous partial dispersion. Such crown glass is available from Schott Glas of Mainz, Germany under the product designation PK 50 and is sold as phosphate crown glass. In a similar way, the lenses 17 and 21 of positive refractive power of the negative inner members 19 and 25 comprise dense flint glass. This glass has anomalous partial dispersion and is sold by Schott Glas under the product designation of SFL 6. In this way, and in the visible spectral range, an apochromatic correction (which is limited only by a diffraction) of the chromatic longitudinal aberration is achieved.

The lens radii, lens thicknesses or air spaces, clear lens diameters and the glass types used can be taken from the following Table 1. In this table, the number corresponds to the particular optically effective boundary surface and is counted from the object-end convex lens surface of lens 9.

TABLE 1

| No. | Radius $r_i$/mm | Thickness or Air Distance $d_i$/mm | Clear Diameter $d_F$/mm | Medium |
|---|---|---|---|---|
| 1 | 39.242 | | 16.5 | |
| | | 2.5 | | BaSF2 |
| 2 | 21.909 | | 16.1 | |
| | | 4.0 | | PK50 |
| 3 | −188.36 | | 15.8 | |
| | | 1.852 ... 27.1 ... 37.41 | | Air |
| 4 | −55.431 | | 14.0 | |
| | | 2.0 | | BaF4 |
| 5 | 15.849 | | 13.2 | |
| | | 3.0 | | SFL6 |
| 6 | 32.081 | | 12.6 | |
| | | 17.74 ... 2.794 ... 17.74 | | Air |
| 7 | −32.081 | | 12.6 | |
| | | 3.0 | | SFL6 |
| 8 | −15.849 | | 13.2 | |
| | | 2.0 | | BaF4 |
| 9 | 55.431 | | 14.0 | |
| | | 37.41 ... 27.1 ... 1.852 | | Air |
| 10 | 188.36 | | 15.8 | |
| | | 4.0 | | PK50 |
| 11 | −21.909 | | 16.1 | |
| | | 2.5 | | BaSF2 |
| 12 | −39.242 | | 16.5 | |

Structural Length: 80 mm

With the data presented above, a structural length of 80 mm results for the zoom system and a focal width of 76.0 mm for positive outer members and a focal length of −42.5 mm for the negative inner members.

The clear lens diameters can be changed in order to approximately adapt this zoom system to the particular specification for installation.

The optical data of a further embodiment of an afocal symmetrical zoom system having a structural length of 60 mm are set forth in Table 2. This table corresponds to Table 1 and the embodiment corresponds to that shown in FIGS. 1 to 3.

TABLE 2

| No. | Radius $r_i$/mm | Thickness or Air Distance $d_i$/mm | Clear Diameter $d_F$/mm | Medium |
|---|---|---|---|---|
| 1 | 27.449 | | 16.5 | |
| | | 2.5 | | BaSF2 |
| 2 | 15.077 | | 16.1 | |
| | | 4.0 | | PK50 |

TABLE 2-continued

| No. | Radius $r_i$/mm | Thickness or Air Distance $d_i$/mm | Clear Diameter $d_F$/mm | Medium |
|---|---|---|---|---|
| 3 | −103.888 |  | 15.8 |  |
|  |  | 1.196 ... 17.25 ... 23.8 |  | Air |
| 4 | −39.343 |  | 14.0 |  |
|  |  | 2.0 |  | BaF4 |
| 5 | 10.769 |  | 13.2 |  |
|  |  | 3.0 |  | SFL6 |
| 6 | 20.360 |  | 12.6 |  |
|  |  | 12.00 ... 2.5 ... 12.00 |  | Air |
| 7 | −20.360 |  | 12.6 |  |
|  |  | 3.0 |  | SFL6 |
| 8 | −10.769 |  | 13.2 |  |
|  |  | 2.0 |  | BaF4 |
| 9 | 39.343 |  | 14.0 |  |
|  |  | 23.8 ... 17.25 ... 1.196 |  | Air |
| 10 | 103.888 |  | 15.8 |  |
|  |  | 4.0 |  | PK50 |
| 11 | −15.077 |  | 16.1 |  |
|  |  | 2.5 |  | BaSF2 |
| 12 | −27.449 |  | 16.5 |  |

Structural Length: 60 mm

With the above data given in Table 2, a zoom system is provided with a structural length of 60 mm wherein a focal length of 50.9 mm is provided for positive outer members and a focal length of −27.3 mm is provided for negative inner members.

The optical data of another embodiment, which corresponds to FIGS. 1 to 3, of an afocal symmetrical zoom system having a structural length of 100 mm is presented in the following Table 3.

TABLE 3

| No. | Radius $r_i$/mm | Thickness or Air Distance $d_i$/mm | Clear Diameter $d_F$/mm | Medium |
|---|---|---|---|---|
| 1 | 56.238 |  | 16.5 |  |
|  |  | 2.5 |  | BaSF2 |
| 2 | 30.209 |  | 16.1 |  |
|  |  | 4.0 |  | PK50 |
| 3 | −191.023 |  | 15.8 |  |
|  |  | 1.762 ... 37.25 ... 51.74 |  | Air |
| 4 | −65.991 |  | 14.0 |  |
|  |  | 2.0 |  | BaF4 |
| 5 | 21.291 |  | 13.2 |  |
|  |  | 3.0 |  | SFL6 |
| 6 | 47.361 |  | 12.6 |  |
|  |  | 23.50 ... 2.5 ... 23.50 |  | Air |
| 7 | −47.361 |  | 12.6 |  |
|  |  | 3.0 |  | SFL6 |
| 8 | −21.291 |  | 13.2 |  |
|  |  | 2.0 |  | BaF4 |
| 9 | 65.991 |  | 14.0 |  |
|  |  | 51.74 ... 37.25 ... 1.762 |  | Air |
| 10 | 191.023 |  | 15.8 |  |
|  |  | 4.0 |  | PK50 |
| 11 | −30.209 |  | 16.1 |  |
|  |  | 2.5 |  | BaSF2 |
| 12 | −56.238 |  | 16.5 |  |

Structural Length: 100 mm

With the data presented in Table 3, for the zoom system having a structural length of 100 mm, a focal width of 102.4 mm results for the positive outer members and a focal width of −59.2 mm results for the negative inner members.

FIG. 4 is a schematic showing the beam path and the optical components of a stereomicroscope 33 of the telescope type.

The stereomicroscope 33 includes a main objective 35 defining a focal plane wherein a viewing object 37 is arranged on the optical axis of this objective. The object 37 is imaged at infinity by the objective 35 via two stereoscopic component beam paths in two stereoscopic sectional images. Of these component beam paths, peripheral rays 39 and 41 are shown for the object point 37 for the one component beam path and peripheral rays 43 and 45 for the object point 37 are shown for the other component beam path. In FIG. 4, the optical axis 47 of the lower stereoscopic component beam path and the optical axis 49 of the upper stereoscopic component beam path can be seen.

The spacing of the optical axes 47 and 49 at the image side with respect to objective 35 is the stereo basis which determines at which stereo angle the object 37 is viewed. Furthermore, the optical axes 47 and 49 at the image side with respect to the objective 35 are parallel to each other as well as to the optical axis of the objective 35.

At the image side of the main objective 35, the afocal zoom system 1 of FIGS. 1 to 3 is arranged in the lower stereoscopic component beam path and an identical afocal system 1" is arranged in the upper stereoscopic component beam path.

The stereomicroscope 33 thus includes a so-called two-channel zoom wherein a separate lens system is assigned to each stereoscopic component beam path. The advantages achieved with the symmetry of the afocal zoom system of the invention can, however, also be achieved with a one-channel zoom wherein the clear lens diameters of the individual lenses of the zoom system are so large that the lenses of the zoom system 1 each include both stereoscopic component beams in correspondence to the main objective 35.

A binocular telescope is arranged at the image side downstream of the symmetrical and afocal zoom systems 1 and 1'. The binocular telescope includes a two-channel tube 51 having occurs 53.

As shown in FIG. 4, the two stereo channels of the binocular telescope each have a common optical axis with the zoom systems 1 and 1', respectively. The binocular telescope comprises the tube 51 and the ocular 53.

In a stereomicroscope of the telescope type, it is a precondition that the respective beams between the main objective 35 and the afocal zoom systems 1 and 1' as well as between the afocal zoom systems 1 and 1' and the two-channel tube 51 are parallel.

The symmetrical zoom system 1 must therefore be afocal, that is, the zoom system has to image object side and image side to infinity in order to be able to exchange the optical components of the stereomicroscope 33 in a modular way. These components are the main objective 35 and the binocular telescope. In this way, for example, main objectives of different focal lengths can be used for varying the working distance or a straight tube can be replaced by an inclined tube or a pivot tube for a binocular telescope comprising tube 51 and ocular 53 for ergonomic reasons. It is understood that the main objective 35 and the binocular telescope can be also combined with other afocal symmetrical zoom systems. Furthermore, components for photo and TV documentation can be inserted especially easily in the regions having a parallel beam path, that is, with parallel beams.

It is thus essential that the afocal zoom system satisfies the afocality in the entire magnification range from Γ=0.4 to Γ=2.4. This can be achieved with adequate precision by adjusting the outer members 13 and 31 of the zoom system 1.

The zoom system for the stereomicroscope 33 comprises two like channels. For this reason, the symmetry provided by the invention results in a high number of pieces each being the same lens which is of very substantial economic advantage. Also, with respect to the required parallelism of the optical axes 47 and 49, the additional complexity, which is required for the parallelism, for maintaining the optical and mechanical centering position of the component members of the afocal system is economically practical with only two different components.

It is understood that the foregoing description is that of the preferred embodiments of the invention and that various changes and modifications may be made thereto without departing from the spirit and scope of the invention as defined in the appended claims.

What is claimed is:

1. An afocal zoom system for a surgical microscope, the afocal zoom system comprising:

four optical members;

said four optical members being arranged in a symmetrical configuration;

said optical members conjointly defining an optical axis and two of said optical members being outer optical members and two of said optical members being inner optical members;

said two outer optical members being fixed in position; and, said two inner optical members being displaceable on two different curves in the same direction.

2. The afocal zoom system of claim 1, each of said outer optical members having one lens made of a glass having anomalous partial dispersion and each of said inner members having one lens made of a glass having anomalous partial dispersion.

3. The afocal zoom system of claim 1, each of said inner optical members having a negative refractive power and each of said outer optical members having a positive refractive power.

4. The afocal zoom system of claim 3, each of said optical members being configured as a composite lens.

5. The afocal zoom system of claim 4, each of said optical members including a lens made of a glass having an anomalous partial dispersion.

6. The afocal zoom system of claim 5, each of said outer optical members having one lens made of a glass having anomalous partial dispersion and each of said inner optical members having one lens made of a glass having anomalous partial dispersion.

7. An afocal zoom system for a surgical microscope, the afocal zoom system comprising:

an even number of optical members;

said optical members being arranged in a symmetrical configuration; and, said zoom system comprises a plurality of lenses having the specifications:

| No. | Radius $r_i$/mm | Thickness or Air Distance $d_i$/mm | Clear Diameter $d_F$/mm | Medium |
|---|---|---|---|---|
| 1 | 39.242 | | 16.5 | |
| | | 2.5 | | BaSF2 |
| 2 | 21.909 | | 16.1 | |
| | | 4.0 | | PK50 |
| 3 | −188.36 | | 15.8 | |
| | | 1.852 . . . 27.1 . . . 37.41 | | Air |
| 4 | −55.431 | | 14.0 | |
| | | 2.0 | | BaF4 |
| 5 | 15.849 | | 13.2 | |
| | | 3.0 | | SFL6 |
| 6 | 32.081 | | 12.6 | |
| | | 17.74 . . . 2.794 . . . 17.74 | | Air |
| 7 | −32.081 | | 12.6 | |
| | | 3.0 | | SFL6 |
| 8 | −15.849 | | 13.2 | |
| | | 2.0 | | BaF4 |
| 9 | 55.431 | | 14.0 | |
| | | 37.41 . . . 27.1 . . . 1.852 | | Air |
| 10 | 188.36 | | 15.8 | |
| | | 4.0 | | PK50 |
| 11 | −21.909 | | 16.1 | |
| | | 2.5 | | BaSF2 |
| 12 | −39.242 | | 16.5 | |

Structural Length: 80 mm.

* * * * *

UNITED STATES PATENT AND TRADEMARK OFFICE
CERTIFICATE OF CORRECTION

PATENT NO. : 5,991,090
DATED : November 23, 1999
INVENTOR(S) : Fritz Strähle

It is certified that error appears in the above-identified patent and that said Letters Patent is hereby corrected as shown below:

Column 3,
Line 51, delete "Y=0.4" and substitute -- $\Gamma$=0.4 -- therefor.
Line 52, delete "Y=1." and substitute -- $\Gamma$=1. -- therefor.

Column 6
Line 19, delete "system 1'"" and substitute -- system 1' -- therefor.
Line 34, delete "occurs 53." and substitute -- oculars 53. -- therefor.

Signed and Sealed this

Twenty-third Day of April, 2002

Attest:

JAMES E. ROGAN
Director of the United States Patent and Trademark Office

Attesting Officer